United States Patent
Kabalnov

(10) Patent No.: US 6,342,094 B1
(45) Date of Patent: Jan. 29, 2002

(54) MINIEMULSION TECHNIQUES FOR INK JET INKS

(75) Inventor: Alexey S Kabalnov, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/494,830

(22) Filed: Jan. 31, 2000

(51) Int. Cl.$^7$ ................................................ C09D 11/02
(52) U.S. Cl. ................................ 106/31.25; 106/31.33; 106/31.47; 106/31.58
(58) Field of Search ................... 106/31.25, 31.33, 106/31.26, 31.47, 31.58

(56) References Cited

U.S. PATENT DOCUMENTS

| | | |
|---|---|---|
| 5,226,957 A | 7/1993 | Wickramanayake et al. ..... 106/31.26 |
| 5,345,254 A | 9/1994 | Wong et al. ................. 347/100 |
| 5,393,461 A * | 2/1995 | Fillipova ..................... 252/314 |
| 5,492,559 A | 2/1996 | Oliver et al. ............. 106/31.25 |
| 5,565,022 A | 10/1996 | Wickramanayake ..... 106/31.25 |
| 5,623,001 A | 4/1997 | Figov ........................... 522/84 |
| 5,643,357 A | 7/1997 | Breton et al. ............. 106/31.25 |
| 5,746,815 A | 5/1998 | Caputo ................... 106/31.25 |
| 5,772,741 A | 6/1998 | Spinelli ................... 106/31.25 |
| 5,837,753 A | 11/1998 | Caputo ........................ 523/161 |
| 6,153,001 A * | 11/2000 | Suzuki et al. ............ 106/31.65 |

FOREIGN PATENT DOCUMENTS

| | | | |
|---|---|---|---|
| EP | 0902064 | 3/1999 | .......... C09D/11/00 |
| WO | WO 99/50364 | 10/1999 | |
| WO | WO 99/50365 | 10/1999 | |

OTHER PUBLICATIONS

Kabalnov et al. "Ostwald Ripening Theory: Application to Fluorocarbon Emulsion Stability," Adv. Colloid Interface Sci. 38:69–97 (1992), no month available.

* cited by examiner

*Primary Examiner*—C. Melissa Koslow
*Assistant Examiner*—Veronica F. Faison
(74) *Attorney, Agent, or Firm*—W. Bradley Haymond

(57) ABSTRACT

Water-based ink-jet ink compositions and a method of making them, the compositions being miniemulsions, i.e., an aqueous vehicle containing oil particles with dissolved dye molecules, the oil particles having a diameter below 1 $\mu$m.

29 Claims, 2 Drawing Sheets

MINIEMULSION TECHNIQUES FOR INK JET INKS

FIELD OF INVENTION

The present invention relates to water-based ink-jet ink compositions that are miniemulsions, i.e., an aqueous vehicle having emulsified oil particles with dissolved dye molecules, the oil particles having a diameter below 1 $\mu$m.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. The typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu$m×35 $\mu$m. The printhead is held and protected by an outer packaging referred to as a print cartridge, i.e., ink-jet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

Inks normally used in ink-jet recording are commonly composed of water-soluble organic solvents (humectants, etc.), surfactants, and colorants in a predominantly aqueous fluid. When a recording is made on "plain paper", the deposited colorants retain some mobility, which can be manifest in poor bleed, edge acuity, feathering, and inferior optical density/chroma (due to penetration of the paper). These features adversely impact text and image quality.

There is a considerable demand for better permanence of ink-jet images. The following permanence attributes are important, but hard to achieve:
1. Waterfastness, that is, stability of the image to water drip;
2. Highlighter smearfastness, that is, stability to highlighter smear;
3. Stability to wet and dry finger smudge.

Waterfastness of inkjet inks can be controlled in different ways and can be achieved both for dye- and pigment-based inks, as exemplified, e.g. by Canon 8500 inkjet printer output in all the colors, and HP890C output in black. However, smearfastness with both wet and dry smudge is more difficult to achieve. One of the approaches is to add a polymeric binder to the inks, as described, e.g. in the international patent applications WO 99/50364 by Yeates et al. and WO 99/50365 by Yeates et al. In these applications, it is suggested to use a polymeric polyurethane, or a polyacrylate in combination with an apolar solvent as an additive to dye-based ink in order to improve the smudgefastness. The polymer loading into the ink formulations is rather high, ~10% and potentially can cause the pen reliability problems Alternatively, adding a UV-curable monomer/oligomer to the inks has been proposed, (see H. Noguchi, UV-Curable Aqueous Ink Jet Ink, IS&T's NIP 14:1998 International Conference on Digital Printing Technologies, p. 107, or U.S. Pat. No. 5,623,001 by M. Figov "Ink Compositions and a Method for making Same"). The problem here is the objectionable smell and toxicity, potential instability of the monomers in the inks, poor curing of water-based systems, and dye fade by UV.

An approach to improve the attributes described above are various 'emulsion' techniques. Emulsions represent plurality of droplets of one liquid in another. Emulsions can have a different type, e.g., oil-in-water(O/W) or water-in-oil (W/O). In addition to this, emulsions are divided on microemulsions and macroemulsions. Microemulsions are thermodynamically known as "swollen micelles", which means that they represent surfactant micelles with the oil solubilized inside. Typical microemulsion particle size is 5–50 nm. Microemulsions are normally transparent or slightly bluish because of the very small particle size. One the other hand, macroemulsions are not in thermodynamic equilibrium and do not form spontaneously, that is, they require mechanical agitation for preparation. Their particle size is larger, 50 nm and up. One of the common examples of macroemulsions is milk.

The use of microemulsions in ink-jet is known. Thus, in the patent of Wickramanayake et al., (U.S. Pat. No. 5,226,957) entitled "Solubilization of Water-insoluble Dyes via Microemulsions for Bleedless, Non-Threading, High Print Quality Inks for Thermal Ink-jet Printers", it is suggested to incorporate an oil-soluble dye into a microemulsion, which contained solvents, surfactants, co-surfactants, and water. In another patent of Wickramanayake (U.S. Pat. No. 5,565,022, "Fast-Drying, Bleed-Free Ink-Jet Ink Compositions"), it is suggested to incorporate a dye into a mixture of an organic solvent, surfactant, and water, so that the dye and waterinsoluble solvent are solubilized by the surfactant. In U.S. Pat. No. 5,643,357 (Brenton et al., "Liquid Crystalline Ink Compositions"), an ink composition is suggested, that contains a surfactant, and oil-or-alcohol-soluble dye, and water. The formulation undergoes a phase transition upon heating from a microemulsion phase to a lamellar phase, which helps to stratify the inks to the surface of the paper, when the printing substrate is heated. In the U.S. Pat. No. 5,492,559 (Oliver et al., "Liquid Crystalline Microemulsion Ink Compositions"), an ink formulation is described containing an aqueous phase, oil phase, and surfactant, and an oilsoluble dye, such that the system undergoes a microemulsion-liquid crystalline state transition with decreasing temperature. The idea is (with some variations) to solubilize water insoluble "solvent" dyes in micelles, and thereby, produce water and smudgefast images.

The use of miniemulsions for inkjet printing has been discussed previously by several authors. In U.S. Pat. No. 5,345,254 by Wong et al., the authors describe the use of an emulsion or suspension of an organic phase in a water phase, so that the organic phase includes at least one oil and wax. In U.S. Pat. Nos. 5,837,753 and 5,746,815 authored by Caputo, stable oil-in-water ink emulsions containing dissolved solvent dyes are described. The systems contain an organic solvent of citrus origin, and a polymeric binder. Spinelli in U.S. Pat. No. 5,772,741 describes an ink formula, containing a non-aqueous phase and a pigment dispersed in water.

However, the need remains for better inkjet ink emulsion formulations. Thus, all the microemulsion formulations fall short of attaining a good print quality because of the excessive ink penetration into the paper and wicking along the fibers. As for the miniemulsions concerned, the need remains for better particle size control and emulsion stability. Also, the need remains in solvents that have less smell, lower toxicity, and higher solubilizing capacity towards the solvent dyes. Finally, the need remains for a solvent system that combines all these attributes together, which is not a trivial task. The problem here is related to the fact that in order to achieve a significant solvent dye solubility in the oil, the oil must be somewhat polar, to match the polarity of the dye chromophores. However, polar oils tend to produce unstable miniemulsions in water because of Ostwald ripening (Kabalnov, A. S. and Shchukin, E. D., "Ostwald Ripening Theory: Application to Fluorocarbon Emulsion Stability," *Adv. Colloid Interface Sci.* 38:69–97 (1992)). The present invention provides the solvent system, previously unknown, that combines these attributes together.

SUMMARY OF THE INVENTION

The present invention relates to an aqueous ink-jet ink composition comprising:
(a) at least one oil-soluble dye;
(b) at least one oil/solvent system; and
(c) an aqueous vehicle,
wherein particles of the oil-soluble dye are dissolved in low-polarity oil particles having a particle size less than 1 $\mu$m, the particles forming a miniemulsion in the water.

The present invention further relates to a method of making an aqueous ink-jet ink composition comprising the steps of:
(a) dissolving an oil-soluble dye in a oil/solvent system to form a dye-containing oil;
(b) adding the dye-containing oil to an aqueous vehicle;
(c) mixing the dye-containing oil into the aqueous vehicle to form a mixture; and
(d) emulsifying the mixture to form an oil-in-water emulsion having dye-containing oil particles no larger than 1$\mu$m in diameter.

BRIEF DESCRIPTION THE DRAWINGS

DETAILED DESCRIPTION OF THE INVENTION

The present invention described herein is directed to ink-jet inks for printing ink-jet images using commercially available ink-jet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8½×11", 20 lb. weight, printer paper conventionally used for office and home computers.

As discussed above, there is a considerable demand for better permanence of ink-jet images. Waterfastness, high-lighter smearfastness and stability to wet and dry finger smudge are especially desirable.

Figure 1A:
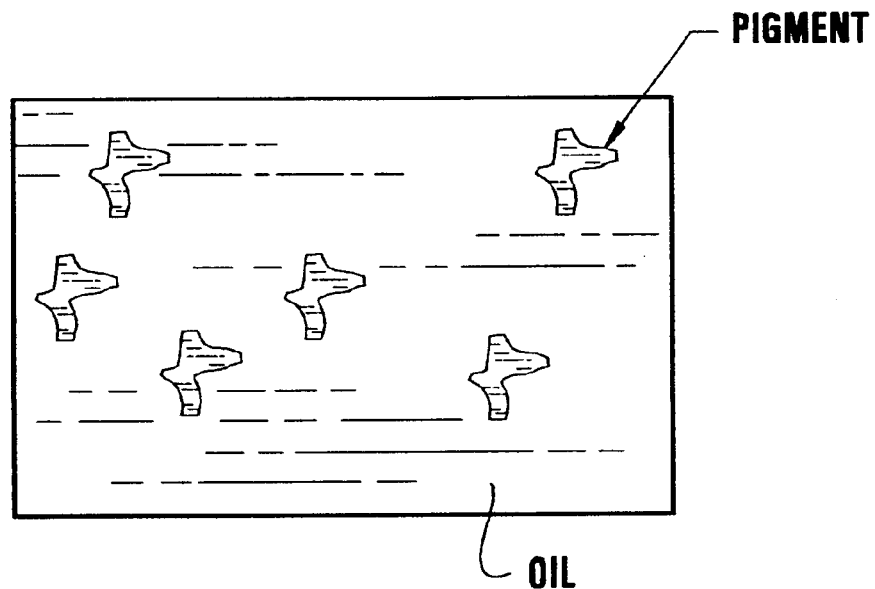
FIG. 1A shows a conceptualization of offset soybean-based inks with pigment floating in oil.
Figure 1B:
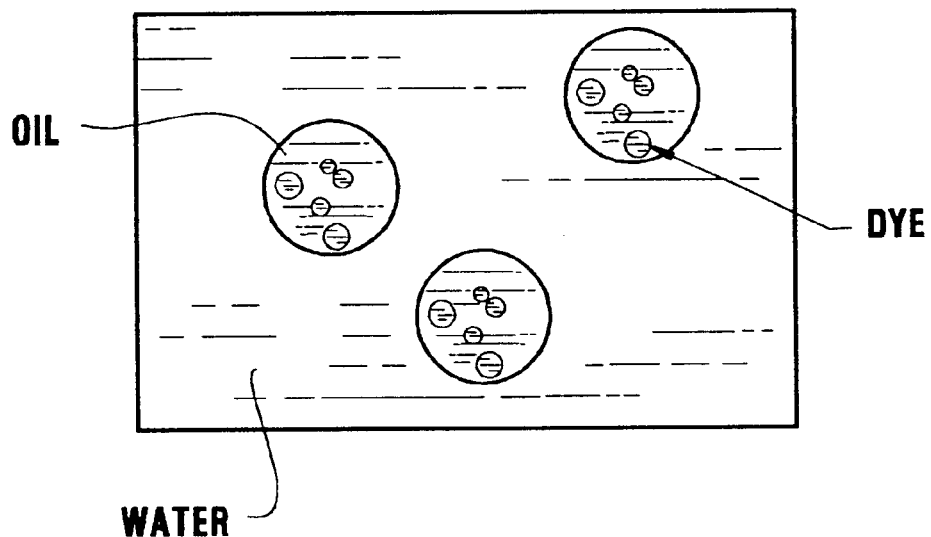
FIG. 1B shows a conceptualization of a miniemulsion o/w with dye floating in oil particles which in turn are floating in water.

An approach to improve the attributes described above are various 'emulsion' techniques. Emulsions represent plurality of droplets of one liquid in another. Emulsions can have a different type, e.g., oil-in-water(O/W) or water-in-oil (W/O). In addition to this, emulsions are divided on microemulsions and macroemulsions. Microemulsions are thermodynamically equilibrium systems, also known as "swollen micelles", which means that they represent surfactant micelles with the oil solubilized inside. Typical microemulsion particle size is 5–50 nm. Microemulsions are normally transparent or slightly bluish because of the very small particle size. On the other hand, macroemulsions are not in thermodynamic equilibrium and do not form spontaneously, that is, they require mechanical agitation for preparation. Furthermore, their particle size is larger, 50 nm and up. One of the common examples of macroemulsions is milk. Finally, 'miniemulsions' is a special case of macroemulsions with smaller particle size, below 1 $\mu$m. They are not thermodynamically stable and do not form spontaneously; however, they can be made very kinetically stable, so that the particle size does not change with time. Miniemulsions with the particle size of 0. 1–0.2 $\mu$m do not settle within several years. High-pressure homogenization is the general procedure for making miniemulsions. Miniemulsions are quite common in the pharmaceutical industry. Thus, Kabi-Pharmacia produces Intralipid® emulsions for intravenous nutrition with the average particle size of 0.1–0.2 $\mu$m. The discontinuous phase of this emulsion is soybean oil (Schubert, O. and Wretlind, A., "Lipid Emulsions," *Acta Chim. Scand.,* 278 Suppl.: 3–21 (1961)). Soybean oil is also used as a vehicle in many offset inks, and several brands of soybean oil for offset inks are available. Obviously, offset ink by itself has a viscosity of ca. 1000 Poise, five orders of magnitude higher than that of the inkjet inks, and cannot be ink-jetted by itself. However, soybean oil emulsion in water can be ink-jetted, and this is one embodiment of the present invention, (see FIGS. 1A and 1B).

Microemulsion-based inks for ink-jet, as discussed in the Background section above, have been developed. The positive side of microemulsion inks is their good waterfastness. Their downsides have also been discovered, which are:
1) poor compatibility with the pen materials.
2) Low chroma of the colors and low optical density of the black.
3) Objectionable smell.
4) Bad edge acuity and strikethrough.
In particular, the bad edge acuity and strike through comes from the fact that the microemulsion inks are very penetrant. This feature cannot easily be avoided. In order to achieve a considerable solubilzation of the dye, the surfactant must have a hydrophilic-lipophilic balance (HLB) value close to the range of 8–12. However, these surfactants are known to be very penetrant. Accordingly, the low chroma comes from excessive penetration into the paper and the low amount of the dye that can be solubilized in the micelles.

The objective of this invention is to resolve these problems by using the "miniemulsion" instead of the microemulsion approach. The advantages are the following:
1) Miniemulsions can be stabilized by a surfactant that does not act as a penetrant. That is, penetration and emulsion stability can be controlled separately by two different surfactants.
2) In miniemulsions, the dye load can be increased compared to microemulsions without increasing viscosity beyond acceptable limits.

A non-limiting example of preferable composition is shown below:

| Oil/solvent system | 10–20% |
|---|---|
| Oil-soluble solvent dye | 3–5% |
| Emulsion stabilizing surfactant or polymer | 1–5% |
| Spreading agent | 0.1–2% |
| Humectants | 10–20% |
| Antibacterial agents, antioxidants | 0.1–1% |
| Polymeric binder | 0–5% |
| Water | balance |

The selection of the oil/solvent system for solvent dyes represents a considerable formulation problem. Indeed, the weight percent of the oil phase in the miniemulsion is limited to at most ca. 20% posed by the requirements of the ink viscosity. To achieve the dye load in the inks of ca. 3%, which is typical for inkjet, the solubility of the dye in the oil should be at least 15%, more preferably ~30%. However, dye molecules are rather polar and require solvents of a matching polarity, such as benzyl alcohol, octyl-2-pyrrolidone, methylethylketone, or cyclohexanone. These solvents show very high solubility in water, and form very unstable emulsions in water because of the Ostwald ripening instability (Kabalnov and Shchukin 1992). Ostwald ripening is the process of gradual dissolution of smaller particles in polydispersed systems and the growth of larger ones at their expense. Particle growth in inkjet inks leads to the settling of the ink and the plugging of the nozzles and therefore needs to be avoided.

On the other hand, emulsions of solvents of lower polarity, such as higher hydrocarbons, or higher alkyl-chain triglycerides are relatively stable against Ostwald ripening, because the solubility of these solvents in water is extremely low. However, they do not dissolve the solvent dyes significantly. It is known that emulsions of relatively water-soluble organic solvents can be stabilized by small additives of considerably less water-soluble compounds (Kabalnov and Shchukin, 1992). Accordingly, in the present invention, the preferred oil/solvent system for the discontinuous phase of the emulsion represents a mixture of two solvents: the first solvent, called the "dye solubilizer" below, and the second solvent, called the "Ostwald-ripening stabilizer."

As the dye solubilizers, the following solvents having relatively high polarity can be used: benzyl alcohol and its derivatives, alkyl-2-pyrrolidones, and its derivatives, cyclohexanone and its derivatives, dialkylphthalates and its derivatives, carboxylic acid esters and dicarboxylic acid diesters. As the Ostwald-ripening stabilizers, hydrocarbons can be used, preferably, with the number of carbon atoms>8 and<~30. Hydrocarbons having shorter chain length than 8 should be avoided because they have a significant solubility in water. Very high molecular weight additives such as paraffin waxes do not impart sufficient stability against Ostwald-ripening because of their relatively lower osmotic pressure (Kabalnov & Shchukin, 1992).

The preferred concentrations of the components in the dispersed phase of the emulsion are: 30% of the dye, 60% of the dye solubilizer, and 10% of the Ostwald-ripening stabilizer.

Some solvents combine the very high stability against the Ostwald-ripening with fair solubilization capacity towards the solvent dyes. For these systems, the two-component solvent system is not needed and the single component system can be used. As non-limiting examples of such solvents, soybean oil and higher carboxylic acid esters, such as methyl oleate, can be used.

A variety of surfactants can be used as the emulsion stabilizers. The preferable type is the same surfactant that is used in Intralipid, which is the natural egg or soya phospholipid. Other surfactants of ionic or non-ionic type with HLB value of 25-15 can be also used. Ionic surfactants must be of the same charge as the dyes not to cause the incompatibility. Block-copolymers of ethylene oxide and propylene oxide can also be used, e.g. Pluronic F68.

As the spreading agents, classical inkjet penetrants can be used, such as Tergitols (secondary alcohol ethoxylates produced by Union Carbide, USA). Fluorinated or siloxane spreading agents are preferred because they will not interfere with the emulsion stability. For example, Silwet L77 (produced by Witco Corporation, USA and Fluorad FC-99 (produced by 3M Company, USA) can be used.

Classical inkjet humectants can be used, including glycols, polyols and 2-pyrrolidone derivatives.

Anti-microbial agents are needed provided that the ink is soybean oil based. A good candidate is Proxel GXL (ICI America), although others also can be used.

Classical antioxidants/complexing agents can be used, such as ascorbic acid salts and Ethylenediaminetetraacetic acid disodium salt (EDTA).

Polymeric binder can be any anionic low-molecular weight polymers, for example, low molecular weight acrylates.

A wide variety of solvent oil-soluble dyes can be used in combination with the inks of the present invention. Among those, one can mention: Solvent Blue 35 (C.I. Index Solvent Blue 35), Oil Blue N (C.I. Index Solvent Blue 14), and Oil Red EGN (C.I. Index Solvent Red 26) dyes from Aldrich; Neozapon Red 395 (C.I. Index Solvent Red 122) dye from BASF, Germany; Oil Yellow 2635 (C.I. Index Solvent Yellow 56) dye from Tricon Colors, Inc., Elmwood Park, N.J., USA; as well as Savinyl dyes from Clariant, Germany (for example, Savinyl Yellow 2GLS (C.I. Index Solvent Yellow 79), Savinyl Yellow RLS (C.I. Index Solvent Yellow 83:1), Savinyl Yellow RLSN (C.I. Index Solvent Yellow 83), Savinyl Yellow 2RLS (C.I. Index Solvent Yellow 62), Savinyl Pink 6BLS (C.I. Index Solvent Red 127), Savinyl Blue RLS (C.I. Index Solvent Blue 45), Savinyl Blue GLS (C.I. Index Solvent Blue 44), Savinyl Black RLSN (C.I. Index Solvent Black 45) and Savinyl Black NS (Proprietary)).

In addition, it has been found that when the ink of the present invention is underprinted by a fluid having a reactive component that binds together the emulsion particles, that the fluid acts as a fixing agent. If the emulsion particles are covered with an anionic surfactant layer, or an anionic polymer, a cationic polymer can play the role of an efficient fixer. Most preferably, the fixer can contain a polyethyleneimine, quarternized by an acid.

It has also been found that when the inks of the present invention are printed on paper and the printed paper is after-treated, durability is improved. It has been found that many of the miniemulsion ink printouts increase their durability after heat treatment. The mechanism of this effect is unclear at this moment, but possibly is related to miniemulsion inversion at elevated temperatures, that is, emulsion droplets on paper merge with each other and form a continuous film.

In one embodiment, the invention relates to an aqueous ink-jet ink composition comprising at least one oil-soluble dye; an oil/solvent system; and an aqueous vehicle. In this embodiment, the particles of the oil-soluble dye are dissolved in oil particles having a particle size less than 1 $\mu$m, the particles forming a miniemulsion in the water. In a preferred embodiment, the particles have particle size of from 0.05 to 0.3 $\mu$m.

In another preferred embodiment of the above, the oil/ solvent system is selected from the group consisting of a soybean oil, an alkyl carboxylate ester, and a mixture of at least two solvents, the at least two solvents comprising a higher polarity solvent and a lower polarity solvent, the lower polarity solvent having solubility in water less than 1 part per million. In a more preferred embodiment of the above, the at least one lower polarity solvent is a hydrocarbon with more than 8 carbon atoms. In another more preferred embodiment of the above, the higher polarity solvent is 1-dodecyl-2-pyrrolidone. In another more preferred embodiment of the above, the solvent mixture contains between 1 and 30 weight percent of at least one lower polarity solvent, more preferably between 15 and 25 weight percent lower polarity solvent, and most preferably approximately 20 per lower polarity solvent. In another more preferred embodiment, the alkyl carboxylate ester is methyl oleate. In another most preferred embodiment of the above, the at least one oil-soluble dye is selected from the group consisting of Solvent Blue 35 (C.I. Index Solvent Blue 35); Oil Blue N (C.I. Index Solvent Blue 14); Oil Red EGN (C.I. Index Solvent Red 26); Neozapon Red 395 (C.I. Index Solvent Red 122); Oil Yellow 2635 (C.I. Index Solvent Yellow 56); Savinyl Yellow 2GLS (C.I. Index Solvent Yellow 79); Savinyl Yellow RLS (C.I. Index Solvent Yellow 83:1); Savinyl Yellow RLSN (C.I. Index Solvent Yellow 83); Savinyl Yellow 2RLS (C.I. Index Solvent Yellow 62); Savinyl Pink 6BLS (C.I. Index Solvent Red 127); Savinyl Blue RLS (C.I. Index Solvent Blue 45); Savinyl Blue GLS (C.I. Index Solvent Blue 44); Savinyl Black RLSN (C.I. Index Solvent Black 45) and Savinyl Black NS (Proprietary). In yet another most preferred embodiment of the above, the at least one oil-soluble dye is dissolved in the oil particles.

In another preferred embodiment of the invention, the composition further comprises: at least one emulsion stabilizing surfactant and at least one spreading agent. In another more preferred embodiment of the above, the at least one emulsion stabilizing surfactant is selected from the group consisting of egg phospholipid, soya phospholipid, ionic surfactants with an HLB value between 25 and 15, nonionic surfactants with an HLB value between 25 and 15, block copolymers of ethylene, and block copolymers of propylene oxide. In yet another more preferred embodiment of the above, the at least one spreading agent is selected from the group consisting of Tergitols, fluorinated spreading agents, and siloxane spreading agents. In still another more preferred embodiment of the above, the composition further comprises at least one ink-jet ink additive selected from the group consisting of humectants, anti-microbial agents, antioxidants, complexing agents and polymeric binders.

In another embodiment, the invention relates to a method of making an aqueous inkjet ink composition comprising the steps of dissolving an oil-soluble dye in an oil/solvent system to form a dye-containing oil; adding the dye-containing oil to an aqueous vehicle; mixing the dye-containing oil into the aqueous vehicle to form a mixture; and emulsifying the mixture to form an emulsion having dye-containing oil particles no larger than 1 µm in diameter. In a preferred embodiment, the particles have particle size of from 0.05 to 0.3 µm.

In another preferred embodiment of the above, the oil/ solvent system is selected from the group consisting of a soybean oil, an alkyl carboxylate ester, and a mixture of at least two solvents, the at least two solvents comprising a higher polarity solvent and a lower polarity solvent, the lower polarity solvent having solubility in water less than 1 part per million. In a more preferred embodiment of the above, the at least one lower polarity solvent is a hydrocarbon with more than 8 carbon atoms. In another more preferred embodiment of the above, the higher polarity solvent is 1-dodecyl-2-pyrrolidone. In another more preferred embodiment of the above, the oil/solvent system has between 1 and 30 weight percent lower polarity solvent, more preferably between 15 and 25 percent lower polarity solvent, and most preferably approximately 20 per lower polarity solvent. In another more preferred embodiment, the alkyl carboxylate ester is methyl oleate. In a most preferred embodiment of the above, the at least one oil-soluble dye is selected from the group consisting of Solvent Blue 35 (C.I. Index Solvent Blue 35); Oil Blue N (C.I. Index Solvent Blue 14); Oil Red EGN (C.I. Index Solvent Red 26); Neozapon Red 395 (C.I. Index Solvent Red 122); Oil Yellow 2635 (C.I. Index Solvent Yellow 56); Savinyl Yellow 2GLS (C.I. Index Solvent Yellow 79); Savinyl Yellow RLS (C.I. Index Solvent Yellow 83:1); Savinyl Yellow RLSN (C.I. Index Solvent Yellow 83); Savinyl Yellow 2RLS (C.I. Index Solvent Yellow 62); Savinyl Pink 6BLS (C.I. Index Solvent Red 127); Savinyl Blue RLS (C.I. Index Solvent Blue 45); Savinyl Blue GLS (C.I. Index Solvent Blue 44); Savinyl Black RLSN (C.I. Index Solvent Black 45) and Savinyl Black NS (Proprietary). In yet another most preferred embodiment of the above, the at least one oil-soluble dye is dissolved in the oil particles.

In another preferred embodiment of the invention, the composition further comprises: at least one emulsion stabilizing surfactant; and at least one spreading agent. In another more preferred embodiment of the above, the at least one emulsion stabilizing surfactant is selected from the group consisting of egg phospholipid, soya phospholipid, ionic surfactants with an HLB value between 25 and 15, nonionic surfactants with an HLB value between 25 and 15, block copolymers of ethylene, and block copolymers of propylene oxide. In yet another more preferred embodiment of the above, the at least one spreading agent is selected from the group consisting of Tergitols (secondary alcohol ethoxylates), fluorinated spreading agents, and siloxane spreading agents. In still another more preferred embodiment of the above, the aqueous vehicle further comprises at least one ink-jet ink additive selected from the group consisting of humectants, anti-microbial agents, antioxidants, complexing agents and polymeric binder.

In another embodiment, the present invention relates to a method of ink-jet printing comprising ejecting at a pixel location on a medium an ink composition as described above. In a more preferred embodiment, this method further comprises the step of ejecting at the pixel location on the medium, immediately before ejecting the ink composition, an underprinting fixing fluid comprising a reactive component that binds together the emulsion particles. In a yet more preferred embodiment, the underprinting fixing fluid comprises a polyethyleneimine and in a most preferred embodiment, the polyethyleneimine is quarternized by an acid.

In yet another embodiment, the above-described method of ink-jet printing further comprises the step of heating the printed medium to a temperature sufficient to increase durability of printed ink on the medium.

EXAMPLES

Example 1

Cyan, magenta and yellow miniemulsion inks were prepared with the ingredients listed in the following Table 1a. The dyes were dissolved in the soybean oil to saturation. The other components were mixed together in water. The oil was added to the aqueous solution, pre-mixed with a T25 Ultra-torrax (Kunkel, IKA Laboratechnik) and sonicated for 10 minutes in an ice bath (XL Sonicator (Neat Systems)).

TABLE 1a

| | |
|---|---|
| Soy Bean Oil (edible brand, Westin) | 10% |
| Egg yolk phospholipid 65% PC, from dry egg yolk, Sigma | 3% |
| Diethylene glycol (Aldrich) | 4% |
| Glycerol (Aldrich) | 10% |
| 2-Pyrrolidone (Aldrich) | 4% |
| FC-99 (Fluorad surfactant, 3M) | 1% |
| Acrylic Polymer Binder (DuPont) | 2% |
| Proxel GXL (ICI America) | 0.2% |
| Dyes: Solvent Blue 35 (Cyan) (Aldrich) | saturated solution in the oil |
| or Solvent Oil Yellow 2635 (Yellow) (Tricon Colors) | " |
| or Solvent Red 395 (Magenta) (BASF) | " |

Tests were conducted on different media with inks using Solvent Blue 35 (C.I. Index Solvent Blue 35) (Cyan); Oil Yellow 2635 (C.I. Index Solvent Yellow 56) (Yellow); and Neozapon Red 395 (C.I. Index Solvent Red 122) (Magenta). Results are shown in Table 2 below. The inks showed a good printability (no nozzles out) and no-excuse waterfastness, highlighter smear fastness, and wet finger smudge on a variety of media, including offset glossy media. The printing was conducted with or without underprinting by a cationic fixer 100% v/v.

The fixer had the composition given in Table 1b below:

TABLE 1b

| Component | |
|---|---|
| Glycerol (Aldrich) | 15% |
| Zonyl FSN (DuPont de Nemours), assuming 100% activity | 1% |
| Ethyltrimethylammonium Chloride | 3% |
| Polyethyleneimine, M = 2000 (Aldrich) | 2.5% |
| Succinic Acid (Aldrich) | 5% |
| Water | balance |

The ink-to-fixer ratio on paper was 1:1 by volume.

Underprinting was observed to improve the area fill uniformity and was used as default. The data below in Table 1c refer to primary colors.

TABLE 1c

| Paper | Under-print | Water-fastness | Highlighter Smear | Dry Smudge | Wet Smudge |
|---|---|---|---|---|---|
| Hammermill Fore DP (Hammermill Papers, USA) | yes | + | + | + | Some transfer in magenta |
| Spectrotech Lustro Laser (Warren, USA) | yes | + | + | + | + |
| Cascade Offset (Boise Cascade, USA) | yes | + | + | + | Some transfer in magenta |
| Utopia III Dull Matte (Appleton Papers, USA) | yes | + | + | + | + |
| Utopia II Gloss (Appleton | yes | + | + | + | + |

TABLE 1c-continued

| Paper | Under-print | Water-fastness | Highlighter Smear | Dry Smudge | Wet Smudge |
|---|---|---|---|---|---|
| Papers, USA) | | | | | |
| Krome Kote Champion International Corp | yes | + | + | + | + |

"+" means that there is no transfer as judge visually.

Example 2

The following dye solutions were prepared:

Cyan: Savinyl Blue GLS (C.I. Index Solvent Blue 44) (Clariant), 30 wt %; 1-Dodecyl-2-pyrrolidone (Aldrich) 60 wt %; dodecane (Aldrich), 10 wt %.

Black: Savinyl Black NS (Proprietary)(Clariant), 30 wt %; 1-Dodecyl-2-pyrrolidone (Aldrich), 60 wt %; dodecane (Aldrich), 10 wt %.

Yellow #1: Savinyl Yellow RLS (C.I. Index Solvent Yellow 83:1) (Clariant), 30 wt %; 1-Dodecyl-2-pyrrolidone (Aldrich), 60 Wt %; dodecane (Aldrich), 10 wt %.

Yellow #2: (comparative example): Savinyl Yellow RLS (C.I. Index Solvent Yellow 83:1) (Clariant), 30 wt %; 1-Dodecyl-2-pyrrolidone (Aldrich), 70 wt %.

The following aqueous ink vehicle was prepared with the components given in Table 2:

TABLE 2

| Component | |
|---|---|
| Glycerol (Aldrich) | 10% |
| Diethylene glycol (Aldrich) | 4% |
| 2-Pyrrolidone (Aldrich) | 4% |
| Sodium Dodecyl Sulfate (Sigma) | 1% |
| EDTA (Aldrich) | 0.2% |
| Trizma base (Aldrich) | 0.2% |

Then 1.5 g of each dye solution described above was emulsified in 13.5 g of the ink vehicle using an XL Sonicator (Heat Systems). The samples were sonicated for 5 minutes in a pulse mode (1 s+1 s) on an ice bath at ½ of maximum power. After sonication, the inks were filtered through a 1.2 $\mu$m filter and filled into HP2000c pens.

Example 3

Particle Size Data of Emulsions

The average particle size data of emulsions prepared according to Example 2 were measured using a Nicomp particle size analyzer (Particle Sizing Systems, Inc., Santa Barbara, Calif., USA) at 90° scattering angle and ~1:10000 dilution. The data are shown in the table below.

TABLE 3

| Color | Intensity-averaged diameter, nm, 30 min after preparation | Intensity-averaged diameter, nm, 3 days after preparation |
|---|---|---|
| Cyan | 160 ± 57 | |
| Black | 123 ± 42 | |
| Yellow #1 | 127 ± 50 | 123 ± 64 |
| Yellow #2 | 133 ± 82 | 204 ± 107 |

Just 3 days after preparation, the difference between the two yellow inks becomes apparent. While the average particle size of the dodecane-containing miniemulsion did not change, the control emulsion shows a considerable particle size increase.

Example 4

Durability Tests: Waterfastness, Highlighter Smear, and Wet Smudge

Waterfastness, highlighter smear and wet smudge tests were performed on the black inks described in Example 2. The results are given in the table below. The comparison with the HP2000c default inks is made for the black inks. Tests were performed on Kromekote 2000 paper (Champion) (Table 4a) and on Eureka Recycled Paper (Fort James) (Table 4b).

TABLE 4a

|  | Example 2 Black Inks | HP 2000c |
| --- | --- | --- |
| Optical density | 1.47 | 1.57 |
| Waterfastness | perfect | perfect |
| Wet smudge | perfect | poor |
| Highlighter smear | No transfer on 1, 2 passes, some transfer on 3 passes | Considerable transfer on 1 pass |

TABLE 4b

|  | Example 2 Black Inks | HP 2000c |
| --- | --- | --- |
| Optical density | 1.02 | 1.27 |
| Waterfastness | Barely noticeable transfer | perfect |
| Wet smudge | Barely noticeable transfer | poor |
| Highlighter smear | No transfer on 1, 2 and 3 passes | Considerable transfer on 1 pass |

The above results show that the wet smudge and highlighter smear of the ink of the present invention are considerably improved over HP2000c black ink.

The durability of cyan and yellow inks prepared according to Example 2 and tested for waterfastness, wet smudge and highlighter smear as above was similar to the above results for the black inks.

Example 5

Figure 2:
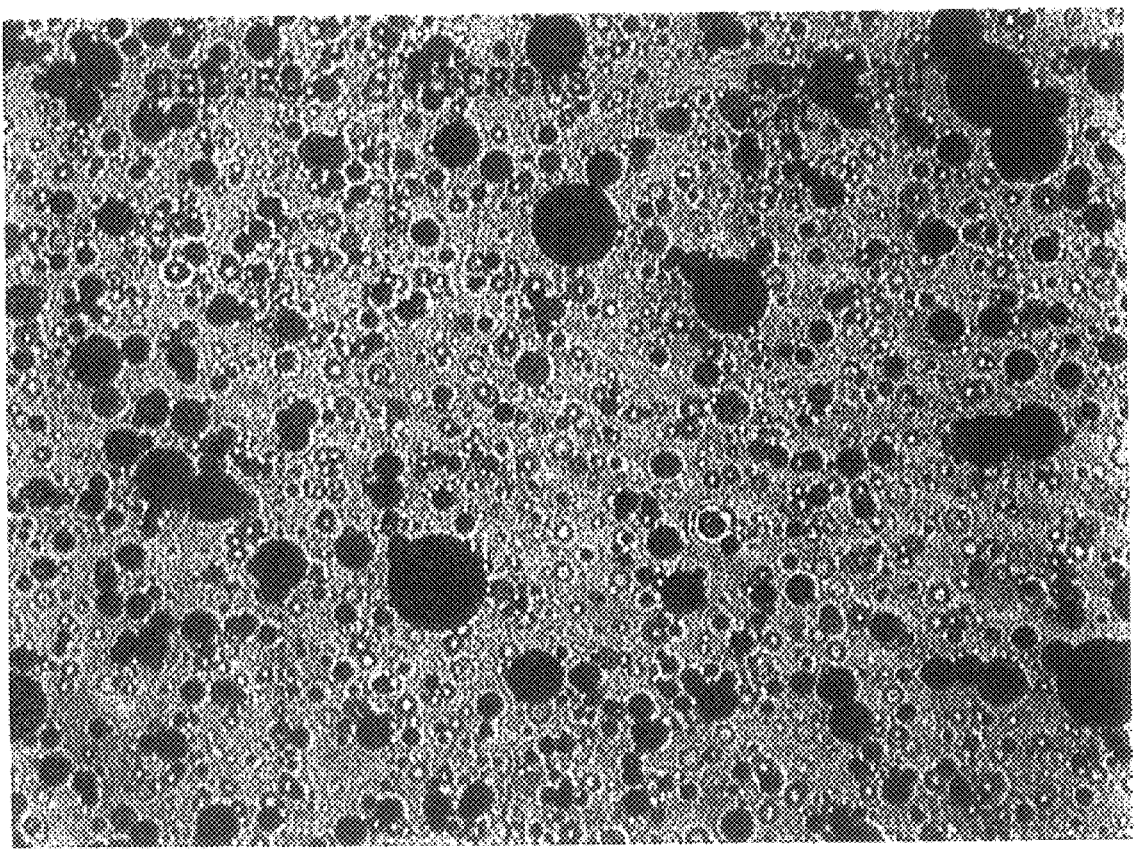
FIG. 2 is a micrograph showing a premix of black inks before sonication as described in Example 5 below.

Inks similar to the ones described in Example 2 were prepared with the difference that the surfactant Pluronic F-68 (BASF) was substituted for the sodium dodecyl sulfate used in Example 2. Resulting inks showed very similar performance to the inks of Example 2 in durability tests as described in Example 4 (waterfastness, wet smudge, and highlighter smear). The micrograph in FIG. 2 shows the pre-mix of black inks before sonication. Note that the black dye was concentrated in the emulsion drops, while the continuous medium was dye-free.

Example 6

5 wt % solution of Oil Blue N (C.I. Index Solvent Blue 14) (Aldrich) was prepared in methyl oleate (Aldrich). 1.5 g of the solution was emulsified in the ink vehicle described in Example 2 by using the same procedure. The resulting emulsion had an average particle size of 99 nm and showed a good printability from HP 2000c pens. The inks showed perfect durability (highlighter smear stability, waterfastness and wet smudge).

Example 7

The black print samples described in Example 4 were subjected to ~100° C. heat for 15 seconds using a heat gun. As a result of the heat treatment, the durability of both the Eureka and Kromekote printouts improved. Wet smudge and waterfastness improved on the Eureka sample while highlighter smear improved on the Kromekote sample.

While the foregoing invention has been described in some detail for purposes of clarity and understanding, it will be clear to one skilled in the art from the reading of this disclosure that various changes in form and detail can be made without departing from the true scope of the invention.

What is claimed is:

1. An aqueous ink-jet ink composition comprising:
   (a) at least one oil-soluble dye;
   (b) at least one oil /solvent system; and
   (c) an aqueous vehicle,
   wherein particles of the oil-soluble dye are dissolved in oil particles of the at least one oil/solvent system, the particles having a particle size less than 1 $\mu$m, and the particles forming a miniemulsion in the water,
   the at least one oil/solvent system being selected from the group consisting of methyl oleate and a mixture of at least two solvents, the at least two solvents comprising a) a higher polarity solvent of 1-dodecyl-2-pyrrolidone and b) a lower polarity solvent having solubility in water less than 1 part per million.

2. The aqueous inkjet ink composition of claim 1, wherein the particles have particle size of from 0.05 to 0.3 $\mu$m.

3. The aqueous ink-jet ink composition of claim 1, wherein the composition further comprises:
   (a) at least one emulsion stabilizing surfactant; and
   (b) at least one spreading agent.

4. The aqueous composition of claim 1, wherein the lower polarity solvent is a hydrocarbon with more than 8 carbon atoms.

5. The aqueous composition of claim 1, wherein the solvent mixture is between 1 and 30 weight percent lower polarity solvent.

6. The aqueous composition of claim 5, wherein the solvent mixture is between 15 and 25 weight percent lower polarity solvent.

7. The aqueous composition of claims 6, wherein the solvent mixture is approximately 20 weight percent lower polarity solvent.

8. The aqueous ink-jet ink composition of claim 3, wherein the at least one emulsion stabilizing surfactant is selected from the group consisting of egg phospholipid, soya phospholipid, ionic surfactants with an HLB value between 25 and 15, nonionic surfactants with an HLB value between 25 and 15, block copolymers of ethylene, and block copolymers of propylene oxide.

9. The aqueous ink-jet ink composition of claim 3, wherein the at least one spreading agent is selected from the group consisting secondary alcohol ethoxylates, fluorinated spreading agents, and siloxane spreading agents.

10. The aqueous ink-jet ink composition of claim 1, wherein the composition further comprises at least one ink-jet ink additive selected from the group consisting of humectants, anti-microbial agents, antioxidants, complexing agents and polymeric binders.

11. The aqueous ink-jet ink composition of claim 1, wherein the at least one oil-soluble dye is selected from the group consisting of Solvent Blue 35, Solvent Blue 14, Solvent Red 26, Solvent Red 122, Solvent Yellow 56, Solvent Yellow 79, Solvent Yellow 83:1, Solvent Yellow 83, Solvent Yellow 62, Solvent Red 127, Solvent Blue 45, Solvent Blue 44, and Solvent Black 45.

12. The aqueous ink-jet ink composition of claim 1, wherein the at least one oil-soluble dye is dissolved in the oil particles.

13. A method of making an aqueous ink-jet ink composition comprising the steps of:
   a) dissolving an oil-soluble dye in at least one oil/solvent system to form a dye-containing oil;
   b) adding the dye-containing oil to an aqueous vehicle;
   c) mixing the dye-containing oil into the aqueous vehicle to form a mixture; and
   d) emulsifying the mixture to form an emulsion having dye-containing oil particles no larger than 1 μm in diameter, the at least one oil/solvent system being selected from the group consisting of methyl oleate and a mixture of at least two solvents, the at least two solvents comprising a) a higher polarity solvent of 1-dodecyl-2-pyrrolidone and b) a lower polarity solvent having solubility in water less than 1 part per million.

14. The method of claim 13, wherein the emulsion formed has dye-containing oil particles from 0.05 to 0.3 μm in diameter.

15. The method of claim 13, wherein the aqueous vehicle comprises:
   (a) at least one emulsion stabilizing surfactant; and
   (b) at least one spreading agent.

16. The method of claim 13, wherein the lower polarity solvent is a hydrocarbon with more than 8 carbon atoms.

17. The method of claim 13, wherein the solvent mixture is between 1 and 30 weight percent lower polarity solvent.

18. The method of claim 17, wherein the solvent mixture is between 15 and 25 weight percent lower polarity solvent.

19. The method of claim 18, wherein the solvent mixture is approximately 20 weight percent lower polarity solvent.

20. The method of claim 15, wherein the at least one emulsion stabilizing surfactant is selected from the group consisting of egg phospholipid, soya phospholipid, ionic surfactants with an HLB value between 25 and 15, nonionic surfactants with an HLB value between 25 and 15, block copolymers of ethylene, and block copolymers of propylene oxide.

21. The method of claim 15, wherein the at least one spreading agent is selected from the group consisting of secondary alcohol ethoxylates, fluorinated spreading agents, and siloxane spreading agents.

22. The method of claim 13, wherein the aqueous vehicle further comprises at least one ink-jet ink additive selected from the group consisting of humectants, anti-microbial agents, antioxidants, complexing agents and polymeric binders.

23. The method of claim 13 wherein the at least one oil-soluble dye is selected from the group consisting of Solvent Blue 35, Solvent Blue 14, Solvent Red 26, Solvent Red 122, Solvent Yellow 56, Solvent Yellow 79, Solvent Yellow 83:1, Solvent Yellow 83, Solvent Yellow 62, Solvent Red 127, Solvent Blue 45, Solvent Blue 44, and Solvent Black 45.

24. The method of claim 13, wherein the oil-soluble dye is dissolved in the oil particles.

25. A method of ink-jet printing, the method comprising ejecting at a pixel location on a medium an ink composition comprising the ink-jet ink composition of claim 1.

26. The method of inkjet printing according to claim 25, further comprising, immediately before ejecting the ink composition, ejecting at the pixel location on the medium an underprinting fixing fluid comprising a reactive component that binds together the emulsion particles.

27. The method of ink-jet printing according to claim 26, wherein the underprinting fixing fluid comprises a polyethyleneimine.

28. The method of ink-jet printing according to claims 27, wherein the polyethyleneimine is quarternized by an acid.

29. An ink-jet printed medium according to the method of claim 25, further comprising the step of heating the printed medium to a temperature sufficient to increase durability of printed ink on the medium.

* * * * *